United States Patent [19]

Pechacek

[11] 4,053,971

[45] Oct. 18, 1977

[54] WRAPPING MACHINE FOR LAYERED VESSELS

[75] Inventor: Raymond E. Pechacek, Houston, Tex.

[73] Assignee: Hahn & Clay

[21] Appl. No.: 712,831

[22] Filed: Aug. 9, 1976

[51] Int. Cl.² .......................................... B23P 19/04
[52] U.S. Cl. ...................................... 29/252; 228/126
[58] Field of Search ...................... 29/252, 469, 157.4, 29/463; 228/126; 24/279, 19; 72/292

[56] References Cited

U.S. PATENT DOCUMENTS 3,916,489   11/1975   Berger .................................. 24/279

FOREIGN PATENT DOCUMENTS 15,433   4/1912   France .................................. 24/279
25,855 of   1908   United Kingdom .................. 24/279

Primary Examiner—James L. Jones, Jr.
Attorney, Agent, or Firm—Pravel, Wilson & Gambrell

[57] ABSTRACT

A wrapping machine for use in constructing layered vessels having at least one layer formed of adjoining vessel sections wherein the wrapping machine has an interlooped band mechanism for positioning adjoining vessel sections adjacent one another and a tightening mechanism in operative engagement with the band mechanism for tightening the band mechanism about adjoining vessel sections with the interlooped band mechanism providing concentric loading of the layered vessel when the tightening mechanism draws the vessel sections together.

9 Claims, 6 Drawing Figures

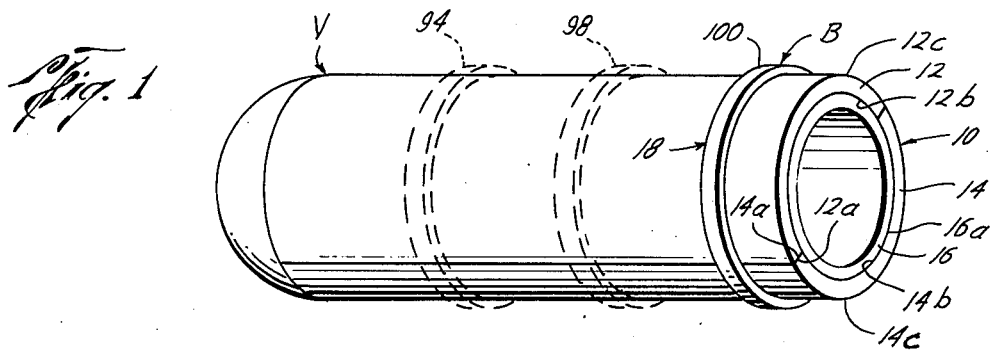
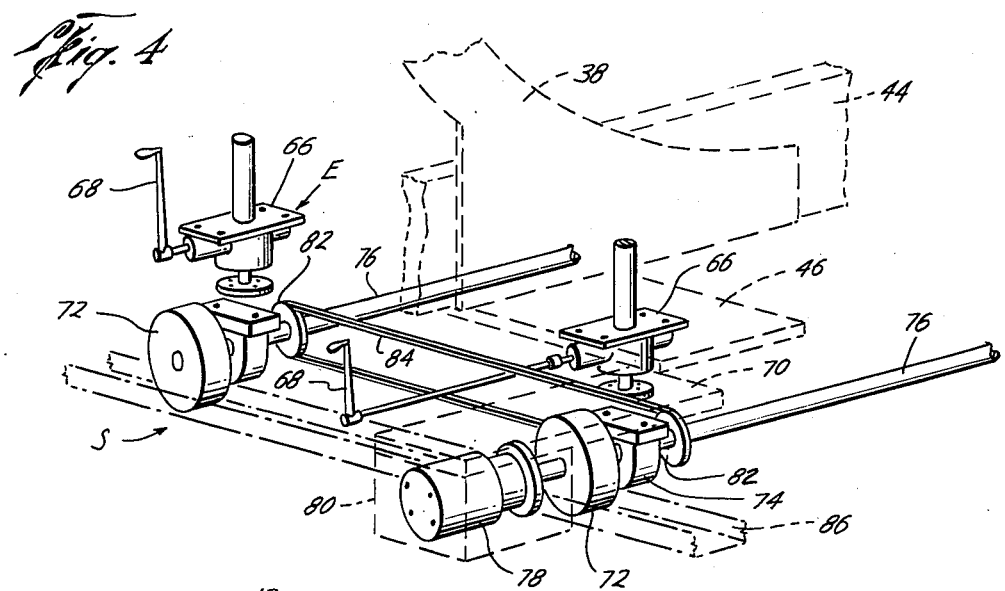
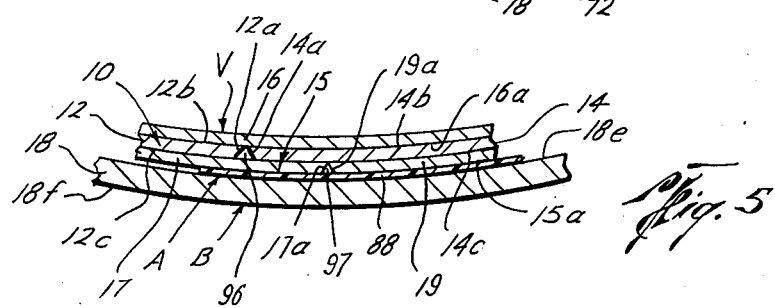
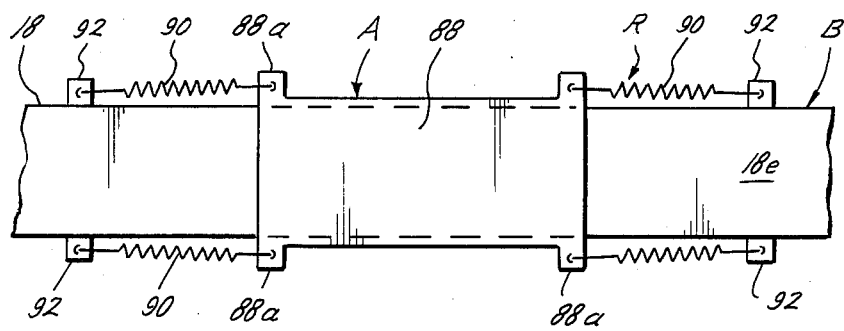

WRAPPING MACHINE FOR LAYERED VESSELS

BACKGROUND OF THE INVENTION

The field of this invention is wrapping machines for use in manufacturing layered vessels, particularly of the type for use in constructing large diameter layered vessels.

Conventional types of wrapping machines typically are of a two-strap or cable variety, such as that pictured in U.S. Pat. No. 2,480,369. Such conventional two-cable type machines are adequate for wrapping relatively small diameter vessels. However, layered vessels that exceed eight feet in diameter are typically difficult to wrap using such machines. Not only are the cables difficult to move into a working position and align due to such cables being flexible and being typically suspended from a supporting structure but also the cables are required to be positioned about the vessel in a spiral fashion. The spiral action of each of such individual cables produces an eccentric loading on the vessel and therefore, two cables must be used, each with a spiral in opposing directions, to counteract the eccentric loading of the layered vessel. Further, the prior art cables typically are supported on a massive structure because the contraction of such cables frequently results in lifting the layered vessel, hence requiring a large supporting structure to bear the weight of the layered vessel and a portion of the wrapping machine. Inasmuch as large wrapping machines must be moved along the length of the layered vessel as the wrapping process progresses, movement, due to the mass of the structure, is slow and cumbersome.

SUMMARY OF THE INVENTION

The present invention relates to a new and improved wrapping machine for use in constructing layered vessels formed of adjoining vessel sections having band means for positioning the adjoining sections adjacent one another for forming a layer of the layered vessel and means for tightening the band means about the adjoining sections to bring them into close contact with the layer therebelow, with the band means being interlooped for eliminating eccentric loading of the sections of the layered vessel being pulled together by the tightening means. This invention is particularly suitable for large diameter vessels, by which is meant vessels having an outer diameter of about eight feet or more.

BRIEF DESCRIPTION OF THE DRAWINGS

FIG. 1 is an isometric view of a large diameter layered vessel schematically showing multiple positional placement of the band means of the present invention;

FIG. 4 is a sectional isometric view of the support means of the wrapping machine of the present invention;

FIG. 5 is a sectional elevational view showing the anti-gall means of the present invention as disposed between the band means and the large diameter layered vessel; and, FIG. 6 is a plan view of the anti-gall means of the present invention as affixed to the band means of the present invention.

DESCRIPTION OF THE PREFERRED EMBODIMENT

Figure 2:
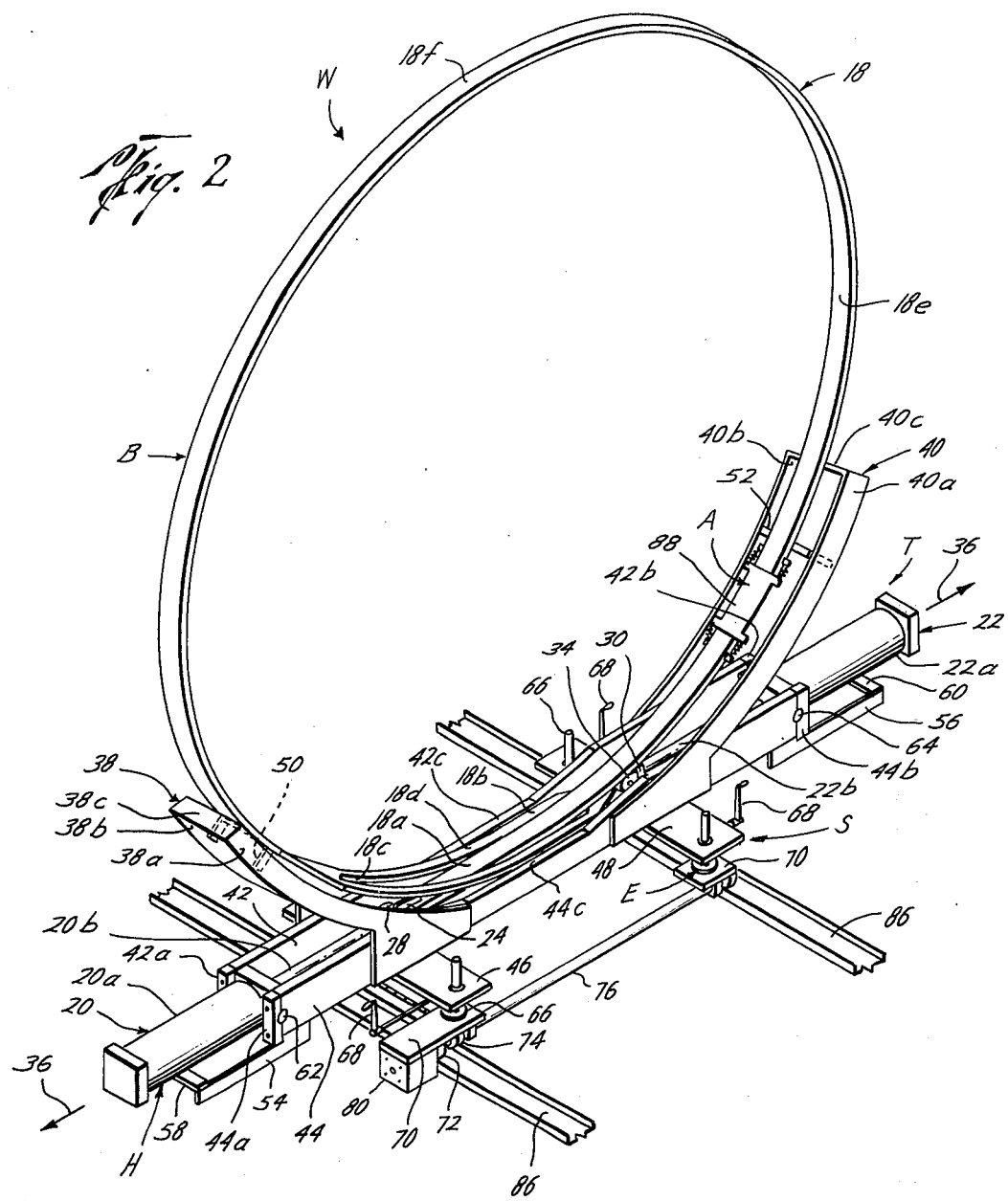
FIG. 2 is an isometric view of the wrapping machine of the preferred embodiment of the present invention.

Referring to the drawings, the letter W designates the wrapping machine of the preferred embodiment of this invention. The wrapping machine W includes band means B, tightening means T and support means S for supporting the band means B and tightening means T as used in constructing a large diameter layered vessel V. Unless otherwise noted, the components of this invention are made of steel, iron or other materials capable of taking relatively heavy stresses and strains without structural failure thereof.

As shown in FIG. 1, typically, large diameter layered vessels V have at least one layer 10 formed of adjoining vessel sections 12, 14. Typically, such vessel sections 12, 14 are formed in arcuate longitudinal sections of substantially 180° and adapted to be fitted about an inner shell 16. A layer 15 (FIG. 5) of vessel sections 17, 19 or any number of additional layers as desired for the desired thickness of the vessel V may be used for constructing the large diameter vessel V in a layered fashion. The vessel sections 12, 14 have longitudinal edges 12a, 14a, respectively, which are adapted to be in close proximity to one another when the vessel sections 12, 14 are in proper location on the vessel V. To insure the proper location and disposition of the vessel sections 12, 14 in forming layer 10, it is necessary that some type of device be used to draw the vessel sections 12, 14 (or any number of sections) together in a tight-fitting, close proximity relationship to insure close engagement, full-face contact of the inner annular surfaces 12b, 14b of the vessel sections 12, 14 with the outer annular surface 16a of the inner shell 16. When the vessel sections 12, 14 are properly positioned, a welder (not shown) typically spot welds the adjoining vessel sections 12, 14 along the longitudinal edges 12a, 14a to secure the vessel sections 12, 14 together. Typically, this is done along the entire longitudinal length of the vessel V to insure that the vessel sections 12, 14 are in a proper aligned, close fitting relationship.

Figure 3:
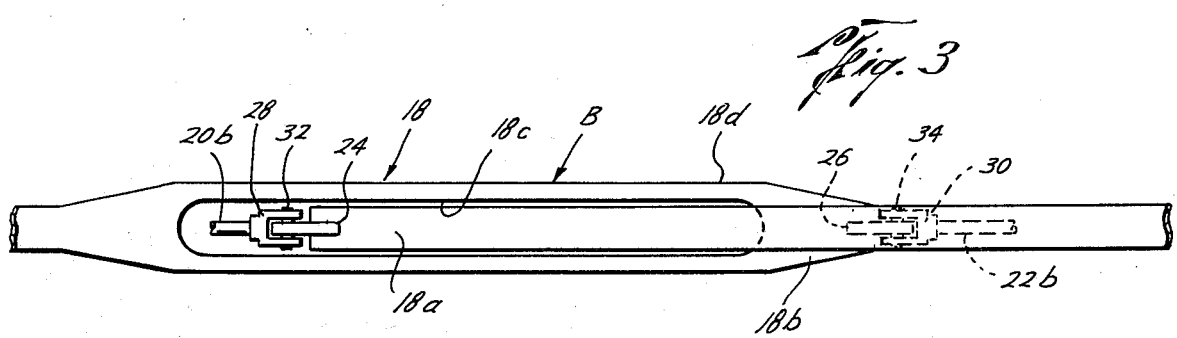
FIG. 3 is a sectional plan view of the interlooped portion of the band means of the present invention.

Considering the preferred embodiment of the present invention as shown in FIG. 2, the wrapping machine W of the present invention includes band means B and tightening means T as may be supported by support means S. The band means B includes a wrapping band 18 preferably formed of a flat, steel bar or any other suitable material. Preferably, the wrapping band 18 is formed into a substantially circular configuration having end portions 18a, 18b and slot 18c formed therewith (FIGS. 2, 3). The wrapping band 18 is preferably formed of a substantially uniform cross sectional area, with the exception that adjacent slot 18c, an enlarged portion 18d is formed to accommodate the slot 18c adjacent thereto. As such, the slot 18c has a width at least slightly larger than the width of the end portion 18a. preferably, the end portion 18a is positioned in and through the slot 18c to form the interlooped configuration of the band means B of the present invention in proximity to the slot 18c. Further, the wrapping band 18 has an inner annular surface 18e and an outer annular surface 18f. The band means B is adapted to be positioned about the large diameter layered vessel V to be formed in a plane substantially perpendicular to the longitudinal axis of the layered vessel V to encircle sections 12, 14 of the vessel V for positioning the adjoining vessel sections 12, 14 adjacent one another on the shell 16 therebelow for forming the layer 10 of the large diameter layered vessel V.

The wrapping machine W of the present invention further includes tightening means T for tightening the band means B about the adjoining vessel sections 12, 14 to insure close engagement of the adjoining vessel sections 12, 14 with the outer annular surface 16a of the shell 16 therebelow. Preferably, the tightening means T acts substantially tangent to the layered vessel V and wrapping band 18 in proximity to slot 18c with the tightening means T being in operative engagement with the band means B.

The tightening means T may include hydraulic means H such as hydraulic cylinders 20, 22 which are adapted to be mounted with the support means S as discussed more fully hereinbelow and affixed with band means B. The hydraulic cylinders 20, 22 include piston housings 20a, 22a, respectively, having pistons (not shown) therein adapted to be fluid actuated by any suitable fluid pressure means (not shown) with the pistons being operatively connected with control rods 20b, 22b, respectively, extending therefrom. The control rods 20b, 22 b are affixed with the band means B at end portions 18a, 18b of the wrapping band 18. Eye brackets 24, 26 mounted with end portions 18a, 18b, respectively (FIG. 3), and rod clevises 28, 30 affixed to control rods 20b, 22b of the hydraulic cylinders 20, 22, respectively, form a pivotal connection therebetween by clevis pins 32, 34 being pivotally mounted with eye brackets 24, 26. As a result, the tightening means T is pivotally connected to the end portions 18a, 18b of the wrapping band 18 to tighten the wrapping band 18 by pulling the end portions 18a, 18b in opposing directions to provide a tensioning force in the direction of arrows 36 (FIG. 2) to constrict the wrapping band 18 about and for joining together the vessel sections 12, 14. The pivotal connection allows the tensioning force to act substantially tangent to the layered vessel V at the end portions 18a, 18b.

The wrapping machine W of the present invention further includes support means S for movably supporting the band means B and tightening means T to provide ease in movement of the same to selected positions along the length of the layered vessel V during assembly of the large diameter layered vessel V. As shown in FIGS. 2 and 4, the support means S includes strap guides 38, 40, support arms 42, 44 and frame supports 46, 48. The strap guides 38, 40 are preferably formed of substantially parallel arcuate side portions 38a, 38b, 40a, 40b, respectively, having ends 38c, 40c, respectively, joining each of the respective arcuate side portions 38a, 38b, 40a, 40b. Strap guide bracket 50 is adapted to be disposed between arcuate side portions 38a, 38b of strap guide 38 as is strap guide bracket 52 between arcuate side portions 40a, 40b of strap guide 40. The strap guide brackets 50, 52 are adapted to engage the outer annular surface 18f of the wrapping band 18 for providing support for and guiding of the wrapping band 18 as positioned thereon.

The side portions 38a, 38b, 40a, 40b of strap guides 38, 40 have support arms 42, 44 securely affixed thereto. Each of the support arms 42, 44 has a reduced portion 42c, 44c roughly approximating the contour of the external surface of the vessel V when using the wrapping machine W of the present invention. Pairs of hydraulic cylinder support arms 54, 56 are mounted adjacent the opposing ends of support arms 42, 44 having support arm cross members 58, 60 therebetween and adapted to support the piston housing 20a, 22a of the hydraulic cylinders 20 of the hydraulic means H.

Hydraulic cylinder 20 is pivotally mounted with support arms 42, 44 by trunnion 62 pivotally connected with support arms 42, 44 by trunnion caps 42a, 44a. In similar fashion, hydraulic cylinder 22 is pivotally connected with the opposite end of the support arms 42, 44 by trunnion 64 secured therewith by trunnion caps 42b, 44b. Thus, hydraulic cylinders 20, 22 are pivotally connected with the support arms 42, 44 by trunnions 62, 64 and pivotally connected with the band means B by rod clevises 28, 30 and clevis pins 32, 34, respectively, to insure that the tensioning force acting in the direction of arrows 36 acts substantially tangent to the layered vessel V in proximity to the slot 18c of wrapping band 18.

Frame supports 46, 48 support the support arms 42, 44 and strap guides 38, 40 assembly having the band means B and tightening means T therewith. The frame supports 46, 48, which may alternatively be of a single piece construction, are preferably rollably supported by a plurality of wheels 72 having suitable elevation means E mounted between the frame supports 46, 48 and wheels 72 for moving the frame supports 46, 48 vertically to provide ease in positioning of the band means B about the vessel sections 12, 14. The elevation means E, as shown in FIG. 4, includes crank driven jacks 66 of any suitable design preferably disposed at each end of frame supports 46, 48. The crank driven jacks 66 are preferably actuated by crank handles 68 operatively engaged thereto. Plates 70 having wheels 72 rollably affixed thereto support the crank driven jacks 66 and frame supports 46, 48 assembly. The crank driven jacks 66 allow for vertical movement of the frame supports 46, 48 with respect to the wheels 72 to raise and lower the wrapping machine W of the present invention. The wheels 72 are affixed to plates 70 by pillow blocks 74 having an axle 76 extending therethrough.

A suitable power means such as hydraulic motor 78 mounted in motor casing 80 affixed to plate 70 may preferably be used to power and rotate the wheels 72. All wheels 72 may be rotated by the use of one hydraulic motor 78 by connecting the axles 76 with suitable sprockets 82 and chain 84, or any other suitable structure such as a V-belt and pulley, to motivate the wheels 72.

The wheels 72 furthermore are adapted to be received in tracks 86, which may be of a suitable channel-like configuration or any other desired shape. Preferably, the tracks 86 are substantially parallel to the longitudinal axis of the large diameter layered vessel V for aligned horizontal movement of the wrapping machine W of the present invention as the layered vessel V is formed therewith.

The wrapping machine W of the present invention further includes anti-galling means A (FIGS. 5, 6) for preventing galling of the band means B by the longitudinal edges 12a, 14a of vessel sections 12, 14 as the tightening means T constricts the band means B about the vessel sections 12, 14. The anti-galling means A is preferably mounted with the band means B. The anti-galling means A includes an anti-gall member 88 preferably formed of brass or other material. As shown in FIG. 6, the member 88 has ears 88a which are adapted to be positioned on the inner annular surface 18e of the wrapping band 18. The anti-gall member 88 is secured to the inner annular surface 18e by means of resilient mounting means R which resiliently mounts the anti-gall member 88 with the band means B for movement along the inner annular surface 18e of the band means B. The resilient mounting means R includes tension springs 90 which connect the anti-gall member 88 with the band means B by means of tabs 92 mounted with the wrapping band 18 and ears 88a formed with the anti-gall member 88. As such, the anti-gall member 88 may move along the inner annular surface 18e of the wrapping band 18, being limited in the amount of movement by the elasticity in springs 90, in response to a galling force. Thus, when an obstruction such as a weld is encountered by the member 88 when drawing the band 18 to a smaller diameter around vessel sections 12, 14 or similar sections, the member 88 may be retarded and held against movement, but the trailing springs 90 compress and the leading springs 90 stretch so that the band 18 itself can continue to be drawn to a smaller diameter. However, once such a galling force is removed, the anti-gall member returns to its balanced, unloaded configuration as shown in FIG. 6 due to the centering action of springs 90.

In the use or operation of the wrapping machine W of the present invention for constructing layered vessels V, the machine W is initially located with the band means B encircling the inner shell or layer 16. Then the first two semi-cylindrical vessel sections 12, 14 are positioned on the outer annular surface 16a of inner shell 16 (FIG. 1) and are likewise encircled by the band means B.

To insure that the vessel sections 12, 14 do in fact have full annular surface engagement, the wrapping machine W is actuated by energizing the hydraulic pistons in the cylinders 20, 22 to draw the ends 18a and 18b of the band 18 in opposite directions so as to reduce the diameter of the band and pull the two vessel sections 12, 14 together such that longitudinal edges 12a, 14a are in close proximity for welding the same together. Tack welds are made on each side of the band at each longitudinal edge 12a, 14a. The sections 12, 14 are brought into close contact with the surface 16a and may even be pre-stressed as disclosed in Stresau U.S. Pat. No. Re 22,251. After such tack welding, the wrapping machine W is rolled by wheels 72 in tracks 86 to the next position relative to the layered vessel V, as more fully explained hereinbelow. By appropriate rotation of crank handles 68 of the crank driven jacks 66, the wrapping machine W may be positioned at an elevation such that the band means B closely approximates the elevation of the layered vessel V which is typically supported by conventional end rollers (not shown), which is well known in the art.

In beginning the operation, the wrapping machine W is rolled on tracks 86 into a position 94 adjacent one end of the layered vessel V, schematically shown in FIG. 1. Any final elevational adjustments are made by appropriately rotating cranks 68 to properly orient the elevation of the wrapping machine W of the present invention while the tracks 86 are substantially parallel to the longitudinal axis of the layered vessel V serve to locate the wrapping machine W substantially perpendicular to the longitudinal axis of the layered vessel V. Prior to actuating the tightening means T, the anti-gall means A is appropriately aligned along the longitudinal edges 12a, 14a of vessel sections 12, 14 such that any exposed edges or welds 96 (FIG. 5) are adjacent to and in engagement with the anti-gall means A. Thereafter, the tightening means T such as hydraulic means H is actuated. The hydraulic cylinders 20, 22, being pivotally connected with end portions 18a, 18b of wrapping band 18 are energized by fluid pressure such that the cylinder control rods 20b, 22b are withdrawn into their respective piston housings 20a, 22a in opposite directions resulting in the tensioning force acting in the direction of arrows 36. As a result of this action, the band means B constricts about the layered vessel V such that the exterior annular surfaces 12c, 14c of the vessel sections 12, 14 are engaged by the inner annular surface 18e of the wrapping band 18. The contracting of the band means B draws the vessel sections 12, 14 together and into close uniform contact with the outer surface 16a of the shell layer 16. Then, tack welding adjacent longitudinal edges 12a, 14a holds the sections 12, 14 in secure, full-faced engagement with the layer therebelow. As the wrapping band 18 contracts, the vessel sections are brought into engagement with one another for such welding to be performed wherein the tensioning force is released after welding thereof.

Thereafter, the wrapping machine W is moved longitudinally on tracks 86 to a second position such as that designated as 98 in FIG. 1 wherein the steps of assembly as above described for position 94 are repeated, making additional tack welds on the longitudinal edges 12a, 14a on opposite sides of the band 18. The band 18 is then released and moved to as many other positions as necessary to adequately tack weld the sections 12, 14, and at each position, the described steps for position 94 are repeated. After the sections 12, 14 are suitably tack-welded, then full final welds are made at the edges 12a, 14a while the band 18 is moved to one side of the vessel V. Thereafter, subsequent layers such as layer 15 of layer sections 17, 19 (FIG. 5) welded with weld 97 along edges 17a, 19a may be added and the procedure repeated as for layer sections 12, 14. As many layers may be thus added as desired to form the full thickness of the vessel wall. It should be understood that although it is preferable to form each layer with two semicylindrical sections such as 12, 14, each layer may be formed of more than two curved sections so long as they form a cylinder when joined together as a layer.

In the preferred embodiment, the wrapping band 18 may accommodate vessels having a variation in overall diameter of approximately twelve inches based upon the travel of the hydraulic cylinder control rods 20b, 22b. If variation in diameter for the vessel V being manufactured exceeds this, then a suitable replacement band means B may be used for the larger and/or smaller diameters.

Thus, the interlooped configuration of the band means B of the present invention eliminates the potential eccentric loading on the layered vessel V which is typically caused by the cable-spiral wound conventional units. The wrapping machine W of the present invention is a lightweight, highly mobile machine requiring only one, inexpensive band means B which does not require manhandling or difficulty in alignment prior to operation thereof. Inasmuch as the band means B is interlooped, a single band means B is sufficient to eliminate the eccentric loading typically manifest in prior art wrapping machines. This is of particular consequence in large diameter layered vessel V inasmuch as the dual-spiral winding units being typically supported above the vessel V have a tendency to lift the weight of the layered vessel V upon contraction thereof which necessitates a large, massive supporting structure, while the wrapping machine W of the present invention may be appropriately positioned by the elevation means E from beneath the vessel V to eliminate such a problem.

Furthermore, the tightening means T, by means of the pivotal connection to band means B results in substantially a straight line tensioning force tangent to the layered vessel V. Suitable adjustment of the elevation means E insures application of the tensioning force by the hydraulic power means H tangent to the layered vessel V. Further, the light-weight structure of the wrapping machine W of the present invention results in a highly mobile, fast acting unit that may be driven by means of the small hydraulic motor 78.

Furthermore, the anti-gall means A is used along the longitudinal edges 12a, 14a of the vessel sections 12, 14 to bridge the weld scarf 96 (FIG. 5) or edges thereof. The anti-gall means A of the present invention enables the constricting band means B to bridge such obstructions and permit the band 18 to move relative to welds 96 or longitudinal edges 12a, 14a without interfering with operation of the band means B. If the anti-gall member 88 engages an obstruction such as a weld, and its movement is stopped, the band 18 can still continue to easily move as the trailing springs 90 are compressed and the leading springs 90 are stretched. The springs 90 yield during such constricting movement. After the tensioning force is released, the springs 90 bring the anti-gall member 88 back to its original position and the wrapping machine W is then ready for the next wrapping operation.

Thus, the wrapping machine W of the present invention is a lightweight, fast acting machine for wrapping large diameter layered vessels V which are typically difficult to wrap and heretofore have required cumbersome, heavy, difficult to use spiral-fashioned wrapping devices.

The foregoing disclosure and description of the invention are illustrative and explanatory thereof, and various changes in the size, shape and materials as well as in the details of the illustrated construction may be made without departing from the spirit of the invention.

I claim:

1. A wrapping machine for use in constructing layered vessels having at least one layer formed of adjoining vessel sections wherein vessel sections are welded together along adjoining longitudinal edges thereof by weldments, comprising:
    band means adapted to encircle sections of the layered vessel for positioning the vessel sections adjacent one another on a layer therebelow for forming one layer of the layered vessel;
    tightening means for tightening said band means about the adjoining vessel sections to insure close engagement of the adjoining vessel sections with the outer surface of the layer therebelow;
    said band means being interlooped for applying concentric loading of the layered vessel by said tightening means when drawing the vessel sections together; and,
    anti-galling means for preventing galling of said band means by the longitudinal edges of the vessel sections or weldments thereof as said tightening means constricts said band means about the vessel sections, said anti-galling means mounted with said band means.

2. The wrapping machine of claim 1, wherein said band means includes:
    a band formed into a substantially circular configuration having a first end portion and a second end portion; and,
    said band further formed having a slot therein, with said first end portion positioned in and through said slot to form said interlooped configuration of said band means.

3. The wrapping machine of claim 2, wherein:
    said tightening means is substantially tangent to the layered vessel and said band in proximity to said slot.

4. The wrapping machine of claim 2, wherein:
    said tightening means is pivotally connected to said end portions of said band to tighten said band by pulling said end portions in opposing directions to provide a tensioning force on said band to constrict said band about and for joining together the vessel sections, said pivotal connection allowing said tensioning force to act substantially tangent to the layered vessel at said end portions.

5. The wrapping machine of claim 1, wherein said tightening means includes:
    hydraulic means for tightening and constricting said band means about the adjoining vessel sections, said hydraulic means being pivotally mounted with said band means.

6. The wrapping machine of claim 1, wherein:
    said band means has an inner annular surface for engaging the outer annular surface of the vessel sections; and,
    said anti-galling means includes:
        an anti-gall member mounted with said inner annular surface of said band means to engage the longitudinal edges or welds of the vessel sections adjacent said band means; and,
        means for resiliently mounting said anti-gall member with said band means.

7. The wrapping machine of claim 6, wherein:
    said resilient mounting means includes tension springs operatively connecting said anti-gall member with said band means.

8. The wrapping machine of claim 1, further including:
    support means for movably supporting said band means and said tightening means to provide ease in movement of the same to selected positions along the length of the layered vessel during assembly of the large diameter layered vessel.

9. The wrapping machine of claim 8, wherein said support means includes:
    a frame support for receivably supporting said band means and said tightening means, said frame support being rollably supported by a plurality of wheels;
    elevation means mounted between said frame support and said wheels for moving said frame support vertically to provide ease in positioning of said band means about the vessel sections; and,
    track means to receive said wheels of said frame support for horizontal directional control of said frame support.

* * * * *